Patented Aug. 9, 1938

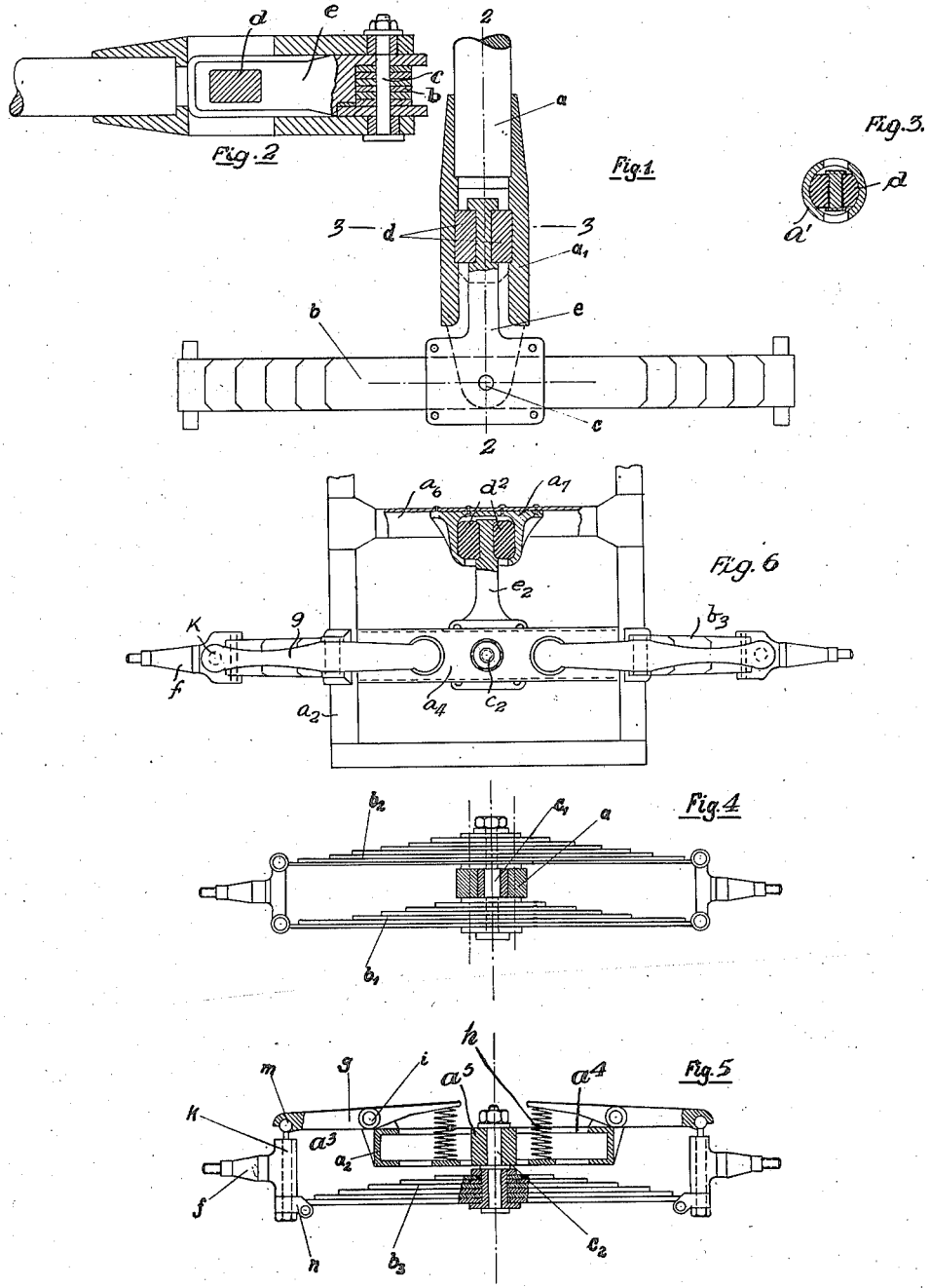

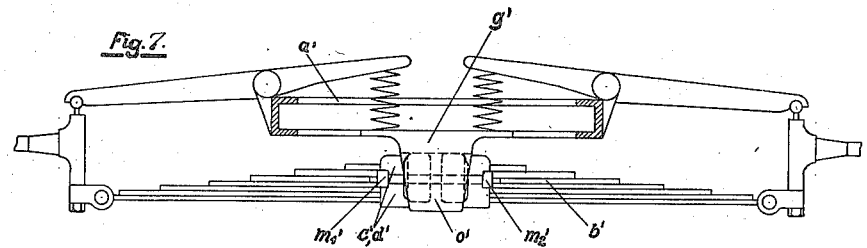
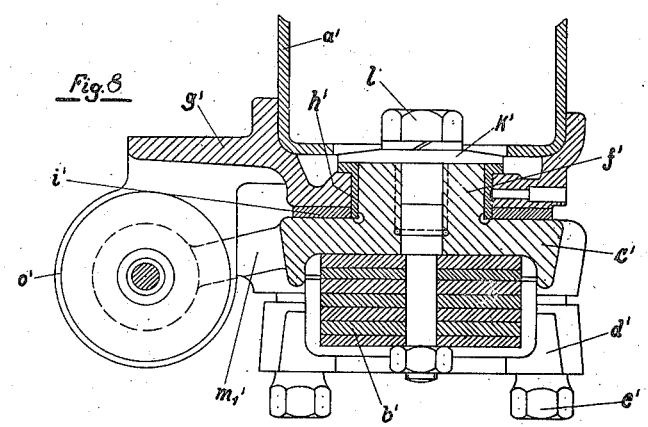
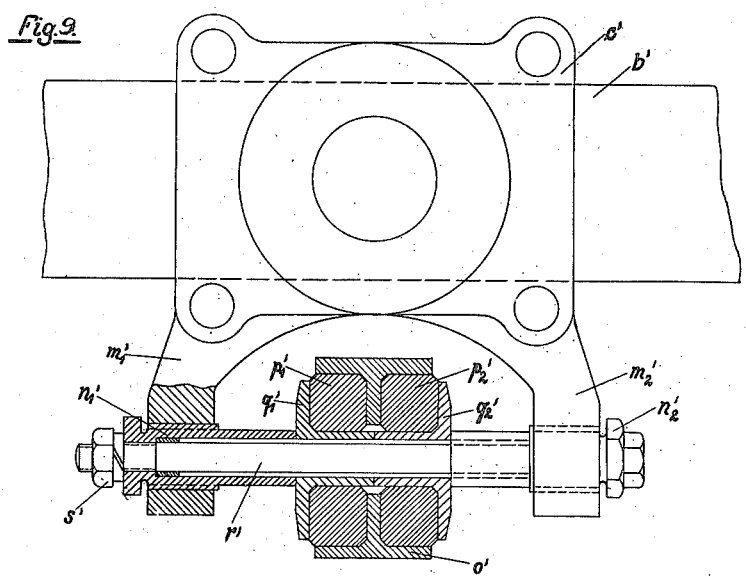

2,126,130

UNITED STATES PATENT OFFICE 2,126,130

SPRINGING OF VEHICLES

Fritz Nallinger, Stuttgart, Germany, assignor to Daimler-Benz Aktiengesellschaft, Stuttgart-Unterturkheim, Germany, a company of Germany Application August 20, 1934, Serial No. 740,657
In Germany August 23, 1933

19 Claims. (Cl. 267—19)

This invention relates to a spring arrangement for wheeled vehicles, more particularly road vehicles having wheels which are guided so as to be displaceable independently of one another, and the invention consists substantially in this that the guiding means such as leaf springs and links, which connect to the frame the wheels of each pair of wheels which face one another, are adapted to swing in unison to a certain extent about a central substantially vertical axis on the frame and are elastically supported against swinging about this axis.

As compared with arrangements in which each wheel is yieldingly mounted so as to be displaceable about a vertical axis independently of the wheel facing it of the same pair of wheels, the present invention has the advantage that both pairs of wheels are positively maintained parallel to one another in the direction of travel even when, owing to forces acting from one side, the sprung part of the vehicle tends to turn out of the direction of travel. At the same time, jolts acting in the direction of travel are elastically taken up and in the case of the steering wheels, shimmying is practically completely eliminated. As compared with arrangements in which a separate pivot is provided for each wheel, the present invention has the further advantage of greater simplicity.

Where transverse springs are employed for guiding and springing the wheels, each half of the spring constitutes a guiding element for the wheel in question. When links, half axles or the like are employed, these members are preferably pivoted on a common central intermediate piece and the latter in turn is yieldingly supported so as to be capable of turning about a vertical axis. The invention is also applicable to rigid axles in that, for instance, the axle is connected by means of a transverse spring with the frame and the transverse spring is mounted on the frame in the manner acccording to the invention.

In the accompanying drawings several constructional examples are illustrated.

Fig. 1 being a plan view partly in section of a wheel springing arrangement with a yielding support, Fig. 2 a longitudinal section on the line 2—2 of Fig. 1, Fig. 3 a cross-section on the line 3—3 of Fig. 1, Fig. 4 is a front elevation partly in section of a wheel springing arrangement comprising two transverse springs which are both pivotally mounted and yieldingly supported, Fig. 5 is a front elevation partly in section of a wheel springing arrangement comprising a transverse spring and a link member, only the transverse spring being capable of turning and yieldingly supported, Fig. 6 is a plan view partly in section of the springing arrangement shown in Fig. 5, Fig. 7 shows a constructional example of the invention as applied to a pivoted axle formed by a transverse spring and two link members, Fig. 8 a cross section, and Fig. 9 a plan view of the connection of the transverse spring with the frame.

The flexible support in Figs. 4 and 5 is not shown, but may be constructed similarly to that in Figs. 1 and 2 or in any other suitable way.

In Figs. 1 and 2, $a$ is the front part of a frame, for instance a tubular frame, at the forward end of which the transverse spring $b$ is supported by means of a pin $c$ in such a manner as to be capable of turning about the vertical axis of this pin. This motion is, however, limited by the rubber buffers $d$ provided in the fork $a_1$ of the frame, against which buffers the arm $e$ of the spring clip, which is rigidly connected with the spring $b$ so as not to turn, bears on both sides. This turning movement of the spring is only possible in opposition to the elastic give of the rubber buffers.

In Fig. 4 the two transverse springs $b_1$ and $b_2$ are connected to one another by a common central pin $c_1$ which is capable of turning in the frame $a$. The arrangement may however, be such that the springs are capable of turning independently about the pin $c_1$ which is for instance fixed in the frame or about separate pins.

In Figs. 5 and 6 the steering swivel $k$ with the wheel carrier $f$ is guided by means of an upper link member $g$ and a lower transverse spring $b_3$, the link member being if desired additionally sprung with respect to the frame by means of a spring $h$. The steering swivel $k$ is connected to the link member $g$ by means of a ball joint $m$ but on the other hand is connected to the leaf spring $b_3$ by means of a joint member $n$ which is capable of turning relatively to the wheel carrier $f$ around the axis of the steering swivel $k$ and relatively to the leaf spring around the axis of the spring bolt $n_1$. The link member $g$ is pivotally mounted by means of a pivot pin $i$ on a bearing block $a_3$ rigidly connected to the longitudinal frame member $a_2$, in such a manner that the link member can swing about an axis extending in the direction of travel.

A bearing block $a_5$ provided on the transverse frame member $a_4$ serves for supporting the leaf spring $b_3$, a pivot pin $c_2$ being mounted in the said bearing block on which the leaf spring $b_3$ is rotatably mounted. For elastically supporting the leaf spring in the direction of rotation about the pivot pin, the spring clip is provided with an arm $e_2$ in a similar manner to the constructional form shown in Figs. 1 to 3 which arm is supported by means of a rubber buffer $d_4$ arranged inside a housing $a_7$ mounted on a transverse frame member $a_6$.

The leaf spring $b_3$ therefore, as far as it is permitted to do so by the rubber buffer $d_2$, can swing to a limited extent around the pivot pin $c_2$. The steering swivel $k$ with the wheel carrier $f$, on the other hand owing to the link member $g$ being incapable of taking part in the swinging movement of the leaf spring about a vertical axis, will be swung forwardly or rearwardly about the ball joint $m$ during the swinging movement of the leaf spring, which is possible in spite of the joint member $n$ owing to the leaf spring $b_3$ being sufficiently elastic in itself to be capable of taking up the twisting stresses which may be set up during the small displacements of the leaf spring about the pivot pin $c_2$.

Instead of the transverse springs the link members can, of course, also be mounted in a corresponding manner. When two transverse springs are used, of which only one is capable of being deflected elastically, it is not necessary, as in Fig. 5, to provide a ball and socket joint at the steering swivel carrier, as in this case, the twisting stresses may be absorbed by both springs simultaneously. On the other hand the two joints ($m$, $n$) can in all cases be constructed as ball and socket joints or the like.

A similar springing arrangement can also be used with rigid axles (more particularly in conjunction with transverse springs) rocking axles or the like.

A further constructional example is illustrated in Figures 7 to 9.

In this example $a'$ is the frame, $b'$ the transverse spring which in its middle part is clamped by a two part casing $c'$, $d'$. The lower part $d'$ is fastened by screws $e'$ against the upper part $c'$ so that the spring is held rigidly so that it can not turn in the casing. The upper part $c'$ is provided with a socket-like extension $f'$ which, by means of bushes $h'$ and a thrust bearing $i'$ is rotatably journalled in the bearing $g'$ fixed to the frame. It is secured against axial displacement by the upper pressure plate $k'$ and the screw connection $l'$.

The upper part $c'$ of the casing is also provided with arms $m_1'$ and $m_2'$, which are directed, for instance, forwards or backwards. In these arms the screw connections $n_1'$ and $n_2'$ are adjustable. The bearing member $g'$ is also provided with an eye $o'$ in which ring-shaped rubber buffers $p_1'$ and $p_2'$ are inserted on either side. On their inner peripheral surfaces and on their outer lateral surfaces the buffers are embraced by the bushes $q_1'$ and $q_2'$ against which the nuts $n_1'$ and $n_2'$ are screwed. The bushes are so dimensioned that, after the rubber has been compressed to a certain extent, they come in contact with one another, and, in this way, prevent it from being stressed too strongly and also ensure the correct initial stressing for obviating wobbling. A bolt $r'$ extending through the arms $m_1'$ and $m_2'$, the eye $o'$ and the rubber buffers within the nuts and bushes serves both for holding the whole supporting device together and for securing the nuts $n_1'$ and $n_2'$ by means of lock nuts $s'$.

Having now particularly described and ascertained the nature of the said invention and in what manner the same is to be performed, I declare that what I claim is:—

1. A springing arrangement for wheeled vehicles, comprising in combination a frame, a pair of wheels facing one another, wheel carriers for said wheels, guiding elements for connecting the wheel carriers with the frame, said guiding elements co-operating with the wheel carriers to guide the wheels so as to move substantially vertically, pivotal means for connecting the guiding elements of the two wheels to the frame so as to be movable in unison around a vertical axis and elastic means abutting directly against a stationary part of the frame and elastically resisting the guiding elements against turning about the vertical axis relative to the frame with the exception of a small amount.

2. A springing arrangement for wheeled vehicles, comprising in combination a frame, a pair of wheels facing one another, wheel carriers for said wheels, linking elements for connecting the wheel carriers with the frame, said linking elements co-operating with the wheel carriers to guide the wheels so as to swing substantially vertically in the plane of the linking elements, means for connecting the linking elements of both the wheels with the frame in such a manner that the said linking elements of both the wheels are adapted to swing only in unison to a certain extent about a substantially vertical axis on the frame, and elastic means abutting directly against a stationary part of the frame and elastically resisting the linking elements against turning about the said axis relative to the frame.

3. A springing arrangement for wheeled vehicles, comprising in combination a frame, a pair of wheels facing one another, wheel carriers for said wheels, a leaf spring for connecting the wheel carriers with the frame, said leaf spring co-operating with the wheel carriers to guide the wheels so as to move substantially vertically in the plane of the leaf spring, pivotal means for connecting the leaf spring with the frame in such a manner that the leaf spring is adapted to turn about a substantially vertical axis in a substantially central longitudinal plane of the vehicle and elastic means abutting directly against a stationary part of the frame and elastically resisting the leaf spring against turning about the vertical axis relative to the frame.

4. A springing arrangement for wheeled vehicles, comprising in combination a frame, a pair of wheels facing one another, wheel carriers for said wheels, guiding elements for connecting the wheel carriers with the frame, said guiding elements co-operating with the wheel carriers to guide the wheels so as to move substantially vertically in the plane of the guiding elements, a vertical pivot arranged substantially in the central longitudinal plane of the vehicle, the said pivot connecting the guiding elements of both the wheels with the frame in such a manner that the wheels are adapted to swing only in unison to a certain extent about the vertical pivot, and elastic means abutting directly against a stationary part of the frame and elastically resisting the linking elements against turning about the vertical pivot relative to the frame.

5. A springing arrangement for wheeled vehicles, comprising in combination a frame, a pair of wheels facing one another, wheel carriers for said wheels, guiding elements for connecting the wheel carriers with the frame, said guiding elements co-operating with the wheel carriers to guide the wheels so as to move substantially vertically in the plane of the guiding elements, an intermediate piece for connecting the guiding elements with the frame, said intermediate piece being journalled about a vertical axis on the frame in such a manner that the intermediate piece in unison with the guiding elements of both the wheels is adapted to turn about the vertical axis, an arm secured to the intermediate piece and elastic buffers abutting directly against a stationary part of the frame and against which the arm is elastically supported so as to elastically resist the intermediate piece against turning about the vertical axis relative to the frame except to a certain small amount.

6. A springing arrangement for wheeled vehicles, comprising in combination a frame, a pair of wheels facing one another, wheel carriers for said wheels, two pairs of guiding members, one pair for each wheel, for connecting the wheel carriers to the frame, the guiding members of each pair being disposed one above the other to form with the wheel carrier and the frame a quadrilateral so as to guide the wheels to move substantially vertically in the plane of the guiding members, pivotal means for pivoting the two guiding members of each wheel in unison to the frame so as to allow the guiding members to turn in unison about a vertical axis substantially in the central longitudinal plane of the vehicle, and elastic means for elastically resisting the said guiding members against turning about the vertical axis.

7. A springing arrangement for wheeled vehicles, comprising in combination a frame, a wheel, a wheel carrier, two guiding members for connecting the wheel carrier to the frame, said guiding members being disposed one above the other so as to co-operate with the wheel carrier to guide the wheel to swing substantially vertically in the plane of the guiding members, pivotal means for pivoting only one of the two guiding members of the wheel, so as to allow the said guiding member to turn about a vertical axis, and elastic means for elastically resisting the said guiding members against turning about the vertical axis.

8. A spring arrangement for wheeled vehicles comprising in combination a frame, a wheel, a wheel carrier, a leaf spring, a link, both the leaf spring and the link connecting the wheel carrier with the frame and disposed one above the other and forming together with the frame and the wheel carrier a flexible guiding quadrilateral, pivotal means for connecting the leaf spring with the frame, which means allows the leaf spring to turn about a substantially vertical axis, elastic means for elastically resisting the leaf spring against turning about the vertical axis, and pivotal means for connecting the link to the frame, in such a manner that the link is adapted to swing only in a vertical plane.

9. A spring arrangement for wheeled vehicles comprising the combination according to claim 7 in combination with a steering swivel for the wheel and universal joints for connecting one of the guiding members with the steering swivel.

10. A spring arrangement for wheeled vehicles comprising the combination according to claim 8 in combination with a steering swivel for the wheel and a universal joint for connecting the link with the steering swivel.

11. A springing arrangement for wheeled vehicles, comprising in combination a frame, a pair of wheels facing one another, wheel carriers for said wheels, guiding elements for connecting the wheel carriers with the frame, said giuding elements co-operating with the wheel carriers to guide the wheels so as to move substantially vertically in the plane of the guiding elements, an intermediate piece for connecting the guiding elements with the frame, said intermediate piece being journalled about a vertical axis on the frame in such a manner that the intermediate piece in unison with the guiding elements of both the wheels is adapted to turn about the vertical axis, two arms secured to the intermediate piece and elastic buffers on the frame between the two said arms for elastically resisting the intermediate piece in unison with the guiding elements against turning about the vertical axis.

12. A spring arrangement for wheeled vehicles comprising the combination according to claim 1 in combination with means for initially stressing the elastic means.

13. A spring arrangement for wheeled vehicles comprising the combination according to claim 11, the elastic buffers being realized by rubber buffers, in combination with means for clamping the rubber buffers, said means comprising adjustable nuts arranged on the arms of the intermediate piece and adapted to be adjusted against the buffers.

14. A spring arrangement for wheeled vehicles comprising the combination according to claim 11, the elastic buffers being realized by rubber buffers, in combination with means for clamping the rubber buffers, said means comprising a bolt connecting the two arms of the intermediate piece, and extending through bores of the rubber buffers, and nuts adjustable on the bolt against the buffers only to a certain tension of the buffers.

15. A spring arrangement for wheeled vehicles comprising the combination according to claim 11, the elastic buffers being realized by two rubber buffers supporting from two sides to an intermediate member rigidly secured to the frame, in combination with means for clamping the rubber buffers, said means comprising a bolt connecting the two arms of the intermediate piece and extending through bores of the rubber buffers and the intermediate member secured to the frame, nuts adjustable on the bolt against the buffers and bushes in the bores of the buffers, said bushes having flanges on the outer sides of the buffers against which the nuts bear in such a manner that by adjusting the nuts to a predetermined extent the bushes in the bores of the two buffers come in contact with one another.

16. A spring arrangement for wheeled vehicles comprising the combination according to claim 3 in combination with a casing embracing the central portion of the leaf spring, said casing being provided with the said pivotal means for connecting the leaf spring with the frame.

17. A spring arrangement for wheeled vehicles comprising the combination according to claim 3 in combination with a casing embracing the central portion of the leaf spring and a short and thick pivot pin integral with the said casing, said pivot pin being journalled with a vertical axis on the frame.

18. A spring arrangement for wheeled vehicles comprising the combination according to claim 3 in combination with a casing embracing the central portion of the leaf spring, said casing being provided with the said pivotal means for connecting the leaf spring with the frame and having arms for elastically resisting the casing in unison with the leaf spring against turning about the vertical axis relative to the frame.

19. A springing arrangement, comprising the combination as set forth in claim 1, with a steering swivel for each wheel, interposed between the guiding elements and the wheel carrier and about which the wheel carrier together with the wheel can be turned relatively to the guiding elements in the steering direction.

FRITZ NALLINGER.